United States Patent [19]

Hinz

[11] 4,150,281
[45] Apr. 17, 1979

[54] ELECTRIC HEATER CONSTRUCTION

[75] Inventor: Edward W. Hinz, Schiller Park, Ill.

[73] Assignee: Tempco Electric Heater Corporation, Schiller Park, Ill.

[21] Appl. No.: 885,614

[22] Filed: Mar. 13, 1978

[51] Int. Cl.² ............................................. H05B 5/58
[52] U.S. Cl. ................... 219/535; 219/523;
  219/510; 219/530; 219/544; 338/240; 425/144
[58] Field of Search ............... 219/510, 530, 536, 523,
  219/540, 535, 541, 544, 552; 425/144, 549;
  338/238, 240, 241, 273, 274

[56]  References Cited
  U.S. PATENT DOCUMENTS

| 3,010,155 | 11/1961 | Gilmore | 425/549 X |
| 3,225,321 | 12/1965 | Walter | 219/523 X |
| 3,340,382 | 9/1967 | Lennox | 219/544 |
| 3,611,559 | 10/1971 | McKay et al. | 29/611 |
| 3,678,249 | 7/1972 | Lennox | 219/544 |
| 3,849,630 | 11/1974 | Halliday | 219/535 |
| 3,890,485 | 6/1975 | Kozbelt | 219/523 |
| 3,920,963 | 11/1975 | Beasley et al. | 219/523 |
| 3,965,808 | 6/1976 | Chometle | 219/523 X |
| 3,970,821 | 7/1976 | Crandell | 219/523 |
| 4,010,351 | 3/1977 | Williams et al. | 219/523 |

Primary Examiner—Volodymyr Y. Mayewsky
Attorney, Agent, or Firm—Van Metre Lund

[57]  ABSTRACT

A heater element is formed by disposing a pair of heater wires and a pair of thermocouple wires and a powdered mineral material in a metal sheath which is subjected to repeated drawing and annealing operations and is then cut to a desired length after which at one end, the heater wires are welded together and the thermocouple wires are welded to the sheath and the sheath is welded to form a closed end wall. At the opposite end, the heater and thermocouple wires are connected to suitable connection wires. The sheath is formed into a helical coil structure and installed in a runnerless bushing of a plastic molding machine.

4 Claims, 5 Drawing Figures

ELECTRIC HEATER CONSTRUCTION

This invention relates to an electric heater and more particularly to an electric heater which can be accurately controlled to supply an optimum amount of heat and which is rugged in construction, highly reliable in operation and readily and economically manufacturable. The heater is especially advantageous when used for heating a bushing in a runnerless plastic molding application.

BACKGROUND OF THE PRIOR ART

Electric heaters are used extensively in connection with plastic molding machines, one type of heater being the band type of heater which surrounds or extends at least part way around a part. Another type of electric heater is the cartridge type of heater adapted to be inserted within a part. The cartridge type has been used in so-called "runnerless" molding machines in which a plastic is injected directly into a mold cavity from the tip of a bushing which is heated to an elevated temperature to permit plastic flow therethrough and which is referred to as a "hot tip bushing". With such an arrangement, it is possible to eliminate sprues and runners and to reduce cycling time. In the bushing, the plastic flows from a receiving end to an exit end through passages which are on the outside of a central torpedo shaped element which encloses the cartridge heater. The cartridge heater, which includes a coiled heating element, may also include a thermocouple junction at the end thereof closest to the exit end of the bushing. The provision of the thermocouple junction makes a heater more expensive to produce but it is advantageous in that the temperature may be sensed at a point close to the exit end of the bushing and the operation may be more accurately controlled to obtain optimum results.

A recent development in runnerless plastic molding is in the provision of a single passage bushing in which the plastic in flowing from the receiving end to the exit end flows in a single central passage rather than through a plurality of parallel passages. This arrangement has a number of advantages including the fact that any one of the number of important types of plastics can be used which could not be used if the plastic were to be separated and then reunited as is the case with the first-described type of hot tip bushing having parallel passages. With the single passage bushing, use of a band type of heater and a separate thermocouple is indicated, the cartridge type of heater being unsuitable for the single passage bushing.

SUMMARY OF THE INVENTION

This invention was evolved with the general object of providing an improved electric heater and with the more specific object of providing a heater especially suitable for use in combination with a single passage hot tip bushing and in similar applications.

In accordance with this invention, a plurality of wires are provided within an elongated sheath along with a suitable insulating material, preferably a mineral material such as magnesium oxide. The wires include at least one and preferably a pair of heater wires of a relatively high resistance material and a pair of thermocouple wires of dissimilar metals. Connection means are provided at one end of the sheath for effecting electrical connections between current supply and instrumentation circuits and the heater and thermocouple wires and junction means are provided at the opposite end of the heater for interconnecting the thermocouple wires to form a junction for measurement of the temperature thereat. With this arrangement, a heater is provided in which heat is developed along the length thereof with a temperature sensing junction being provided at the end removed from the end at which electrical connections are made for the purpose of electrically sensing the temperature and applying a corresponding current to the heater wires.

In accordance with a very important feature, the sheath is in the form of a helical coil structure with the connection and junction means being at opposite axial ends thereof. The heater so constructed is particularly advantageous for surrounding and heating a single passage bushing for a runnerless plastic molding operation as above described, as well as for other similar applications. Heat may be developed and applied through the nearly full axial length of the bushing and the thermocouple junction, being disposed at the end remote from the connection means, may be closely adjacent the exit end of the bushing to permit sensing of the temperature thereat and accurate control of heating for optimum operation.

Other important features relate to methods of making the heater and to resultant advantageous physical properties and attributes of the heater so formed. A plurality of wires along with insulating material such as magnesium oxide are disposed within a metal sheath which is subjected to repeated drawing and annealing steps to reduce the diameter of both the sheet and the wires to a small fraction of the initial diameters thereof while preventing crystallization of the sheaths and wires and preserving the initial ductal qualities thereof. The sheath is then cut to a desired length and wells are formed to interconnect the thermocouple wires and form the junction. Preferably, the heater wires are welded together and insulated from the sheath. The end of the thermocouple wires may be coupled to the sheath and after which the end of the sheath is welded in a manner such as to provide a closed and sealed end. The sheath may then be formed into a helical coil structure and suitable electrical connectors may be added, as desired.

The heater so constructed has a relatively simple construction and is readily and economically manufacturable while being rugged and reliable as well as highly effective, permitting optimum application of heat and accurate control of temperature.

This invention comtemplates other objects, features and advantages which will become more fully apparent from the following detailed description taken in conjunction with the accompanying drawings.

DESCRIPTION OF A PREFERRED EMBODIMENT

Figure 1:
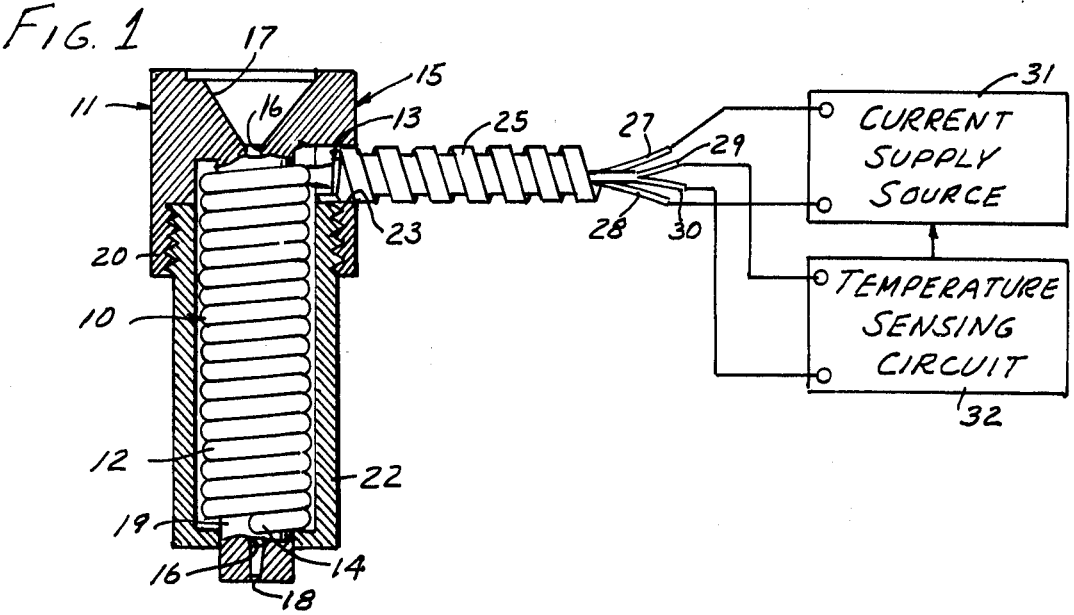
FIG. 1 is a side elevational view of a heater according to the invention, shown installed in a plastic molding machine bushing which is shown partly in section.

Reference numeral 10 generally designates an electric heater constructed in accordance with the principles of this invention, shown installed in a bushing 11 of a plastic molding machine. The heater 10 includes a coiled element 12 extending from a connector portion 13 at one end to an opposite terminal end 14.

The illustrated bushing 11 includes a base member 15 having a plastic flow passage 16 extending centrally from an enlarged receiving end portion 17 to a narrowed exit end portion 18. Plastic flows from a suitable manifold into the receiving end portion 17, thence through the central passage 16 and thence through the exit end portion 18 directly into a mold cavity. With this arrangement, no sprues or runners are required.

The heater 10 is disposed in surrounding relation to a cylindrical portion 19 of the member 15, through which the passage 16 extends, and is surrounded in part by an outer cylindrical wall portion 20 of member 15 and in part by an end cap member 22 threaded into the end of wall portion 20. The wall portion 20 has an opening 23 which receives an end of a flexible sheath 25, the sheath 25 being locked in position by the cap member 22. The sheath 25 receives the connector portion 13 of element 12 and protects connection wires which include a pair of heater connection wires 27 and 28 and a pair of thermocouple connection wires 29 and 30. As hereinafter described, such connection wires are connected to heater wires within the element 12 and to thermocouple wires which extend to a junction within the terminal end portion of the element 12 and, as diagrammatically illustrated, such connection wires are connected to a current supply source 31 and a temperature sensing circuit 32 which may operate to control the current supply source to maintain a substantially constant temperature at the junction within the terminal end portion 14 and thereby maintain a substantially constant temperature at the exit end of the bushing 11.

Figure 2:
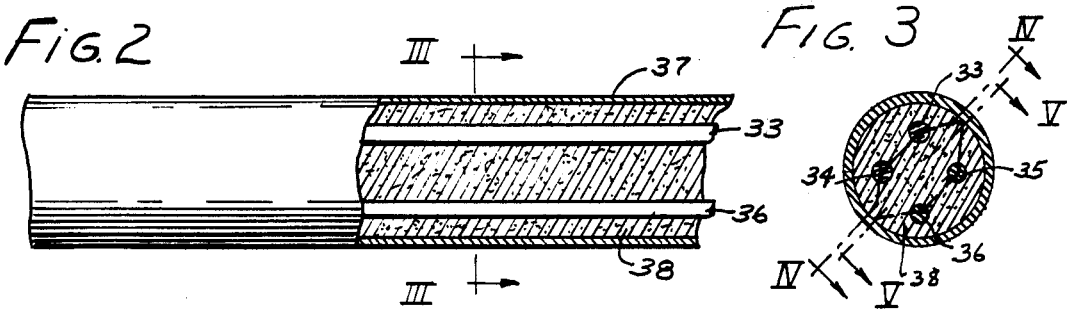
FIG. 2 is a side elevational view, partly in section, of a portion of a heater element in an initial stage of construction thereof, before being reduced in size by drawing operations.
Figure 3:
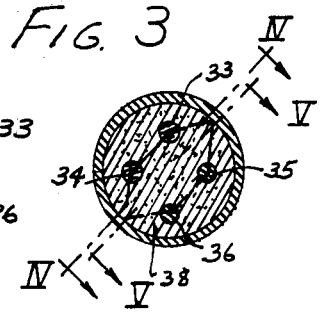
FIG. 3 is a sectional view, taken substantially along line III—III of FIG. 2.
Figure 4:
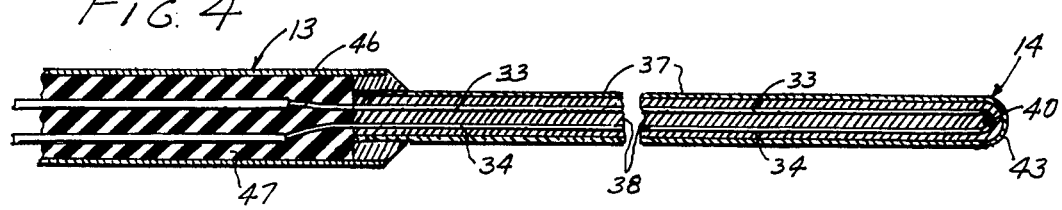
FIG. 4 is a sectional view of portions of a heater element in a later stage of construction thereof, subsequent to drawing operations, FIG. 4 being to the same relative scale as FIGS. 2 and 3, but being on an enlarged scale in relation to FIG. 1 and being taken in a plane as indicated by line IV—IV of FIG. 3.
Figure 5:
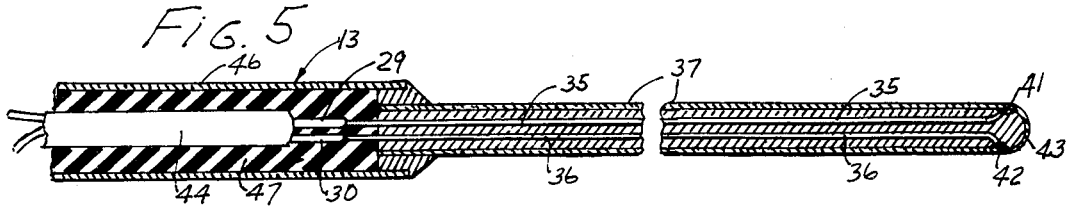
FIG. 5 is a sectional view similar to FIG. 4 but taken in a different plane indicated by line V—V in FIG 3.

FIGS. 2 and 3 show a portion of a heater element in an initial stage of construction thereof. A pair of heater wires 33 and 34 and a pair of thermocouple wires 35 and 36 are disposed in a metal sheath 37 which is filled with a suitable insulating material which is preferably in powdered mineral material such as magnesium oxide. The cross-sectional dimensions of the sheath 37 and wires 33–36 are initially much larger than required for the final construction and the sheath 37, after assembly of the wires therein, is subjected to repeated drawing and annealing operations to reduce the sizes of the sheath and the wires. Initially, the insulating material, indicated by reference numeral 38, is so compacted as to become an essentially incompressible medium and thereafter as the drawing and annealing operations are continued, the cross-sectional dimensions of the sheath and wires are reduced in proportion to each other. After such operations, the sheath 37 is cut to the desired length and then at one end, the heater wires are interconnected as by forming a weld 40 therebetween. The thermocouple wires 35 and 36 are also joined together to form a junction for temperature sensing, preferably by forming welds 41 and 42 between the ends thereof and the sheath 37. Then through a welding operation, a closed end wall 43 is formed to complete formation of the terminal end portion 14 of the element 12.

At the opposite end, the ends of the heater wires 33 and 34 are welded or otherwise connected to the heater connection wires 27 and 28 and the ends of the thermocouple wires 35 and 36 are welded or otherwise connected to the thermocouple connection wires 29 and 30 which may be enclosed in a spagetti tubing member 44 of insulating material. A metal sleeve is disposed around the connections so formed and is brazed or otherwise secured to the sheath 37, the sleeve which is indicated by reference numeral 46 being filled with a suitable insulating material 47 to complete formation of the connector portion 13.

The sheath 37 is formed into a coil for use in the bushing 11 but it will be understood that it may take other configurations for use in other applications.

It will be understood that other modifications and variations may be effected without departing from the spirit and scope of the novel concepts of this invention.

I claim as my invention:

1. In an electric heater, an elongated hollow metal sheath, a plurality of wires extending longitudinally within said sheath including at least one heater wire of a relatively high resistance material and a pair of thermocouple wires of dissimilar metals, insulating material within said sheath for insulating said wires from said casing and from each other, connection means at one end of said sheath for electrical connections between said heater and thermocouple wires and current supply and instrumentation circuits, and junction means at the opposite end of said sheath for interconnecting said pair of thermocouple wires to form a junction for measurement of the temperature thereat, said insulating material being a compacted mineral material, the degree of compaction of said mineral material and the physical properties of said sheath and said wires being such as obtained by assembling wires and mineral material in a sheath and then repeatedly performing drawing and annealing operations to reduce the diameters of the sheath and wires assembled therein to a small fraction of the initial diameter while compacting the mineral material, said elongated sheath being in the form of a helical coil structure with said connection means and said junction means being at opposite axial ends of said helical coil structure, said helical coil structure being directly mounted on an external cylindrical surface of a tubular metal part for direct transmission of heat to the part, an outer tubular member non-directly enclosing said helical coil structure, and said helical coil structure being tightly wound with adjacent convolutions being in direct engagement with each other for uniform transmission of heat to the metal part along the length thereof and to minimize outward transmission of heat from the metal part and from the helical coil structure by convection.

2. In an electric heater as defined in claim 1, said junction means comprising weld means joining the ends of both of said thermocouple wires to said sheath.

3. In an electric heater as defined in claim 2, said weld being effective to define a closed end wall of said sheath.

4. In an electric heater as defined in claim 2, said wires including a pair of heater wires in said sheath and weld means interconnecting the ends of said pair of heater wires at said opposite end of said sheath.

* * * * *